(12) United States Patent
Kubo et al.

(10) Patent No.: US 11,307,330 B2
(45) Date of Patent: Apr. 19, 2022

(54) VARIABLE FOCAL LENGTH OPTICAL SYSTEM

(71) Applicant: MITUTOYO CORPORATION, Kanagawa (JP)

(72) Inventors: Koji Kubo, Tokyo (JP); Yuko Shishido, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 17/148,998

(22) Filed: Jan. 14, 2021

(65) Prior Publication Data
US 2021/0223443 A1    Jul. 22, 2021

(30) Foreign Application Priority Data
Jan. 20, 2020 (JP) .............................. JP2020-006663

(51) Int. Cl.
G02B 1/06 (2006.01)
G02B 3/14 (2006.01)
G02B 13/00 (2006.01)

(52) U.S. Cl.
CPC ........... *G02B 3/14* (2013.01); *G02B 13/0095* (2013.01)

(58) Field of Classification Search
CPC .... G02B 3/14; G02B 13/0095; G02B 26/004; G02B 7/04; G02B 21/02; G02B 21/367; G02B 15/04; G02B 21/361
See application file for complete search history.

(56) References Cited

U.S. PATENT DOCUMENTS

2013/0128223 A1* 5/2013 Wood ................. A61B 1/00186
351/206
2019/0121056 A1* 4/2019 Nagahama ........... H04N 5/2254

FOREIGN PATENT DOCUMENTS

JP         2019-74722         5/2019

* cited by examiner

*Primary Examiner* — James C. Jones
(74) *Attorney, Agent, or Firm* — Greenblum & Bernstein, P.L.C.

(57) ABSTRACT

A variable focal length optical system includes: an imaging lens configured to condense a parallel beam of light from an objective lens to form an intermediate image; a relay system including, in sequence from an object side, a first relay lens and a second relay lens and configured to relay the intermediate image to infinity; and a lens system of a liquid resonant type which is located between the first relay lens and the second relay lens. A front principal point of the lens system is located to be conjugated with an exit pupil of the objective lens and an expression, $1.90 \leq f_{Tube}/f_{R1} \leq 2.15$, is satisfied. In the expression, $f_{Tube}$ denotes a focal length of the imaging lens and $f_{R1}$ denote a focal length of the first relay lens.

3 Claims, 3 Drawing Sheets

VARIABLE FOCAL LENGTH OPTICAL SYSTEM

The entire disclosure of Japanese Patent Application No. 2020-006663 filed Jan. 20, 2020 is expressly incorporated by reference herein.

TECHNICAL FIELD

The present invention relates to a variable focal length optical system.

BACKGROUND ART

A liquid resonant lens system has been developed as a graded-index variable focal length lens in recent years and a variable focal length optical system including this lens system has been known (for instance, Patent Literature 1: JP 2019-074722 A). The variable focal length optical system is used in combination with, for instance, an objective lens of a microscope and a refractive index of the lens system periodically changes in response to a drive signal, causing a focusing position relative to an object to periodically change.

In particular, Patent Literature 1 discloses a variable focal length optical system including a relay system. Specifically, in the variable focal length optical system, a parallel beam of light enters an imaging lens from an objective lens, the imaging lens forms an intermediate image, and two relay lenses relay the intermediate image to be re-imaged on an image capturing surface of a camera or the like. In this regard, the lens system is located between the two relay lenses with an exit pupil of the objective lens and a principal point of the lens system conjugated. Such a variable focal length optical system enables to keep a total magnification of a microscope constant even while a focal length of the lens system is changing Patent Literature 1, however, does not disclose a specific optical design of the variable focal length optical system including the relay system.

For the variable focal length optical system including the relay system, a focal length of the imaging lens, focal lengths of the relay lenses, etc. relate to performance such as a range of variation in focusing position (scan range) and a Strehl ratio. Therefore, the performance such as the scan range and the Strehl ratio will be deteriorated unless a power balance between these lenses is appropriately set.

SUMMARY OF THE INVENTION

An object of the invention is to provide a variable focal length optical system including a relay system configured to keep a total magnification of a microscope constant and ensuring a scan range and a Strehl ratio.

According to an aspect of the invention, a variable focal length optical system used in combination with an infinity corrected objective lens includes: an imaging lens configured to condense a parallel beam of light from the objective lens to form an intermediate image; a relay system including, in sequence from an object side, a first relay lens and a second relay lens, the relay system configured to relay the intermediate image to infinity; and a lens system of a liquid resonant type which is located between the first relay lens and the second relay lens, the lens system having a refractive index that changes in response to an inputted drive signal, in which a front principal point of the lens system is located to be conjugated with an exit pupil of the objective lens, and with $f_{Tube}$ denoting a focal length of the imaging lens and $f_{R1}$ denoting a focal length of the first relay lens, an expression (1) below is satisfied, $$1.90 \leq f_{Tube}/f_{R1} \leq 2.15 \quad (1).$$

In the variable focal length optical system of the above aspect of the invention, it is preferable that, with X denoting a distance from a front end surface of the lens system to the front principal point of the lens system, an expression (2) below be satisfied, $$X < f_{R1} \leq 2X \quad (2).$$

In the variable focal length optical system of the above aspect of the invention, it is preferable that, with $f_{R2}$ denoting a focal length of the second relay lens and $f_{obj1x}$ denoting a focal length of the objective lens with 1× magnification, an expression (3) below is satisfied, $$f_{R2} = f_{obj1x} \times f_{R1}/f_{Tube} \quad (3).$$

DESCRIPTION OF EMBODIMENT

Configuration of Microscope System

Description will be made on an overall configuration of a microscope system 1.

Figure 1:
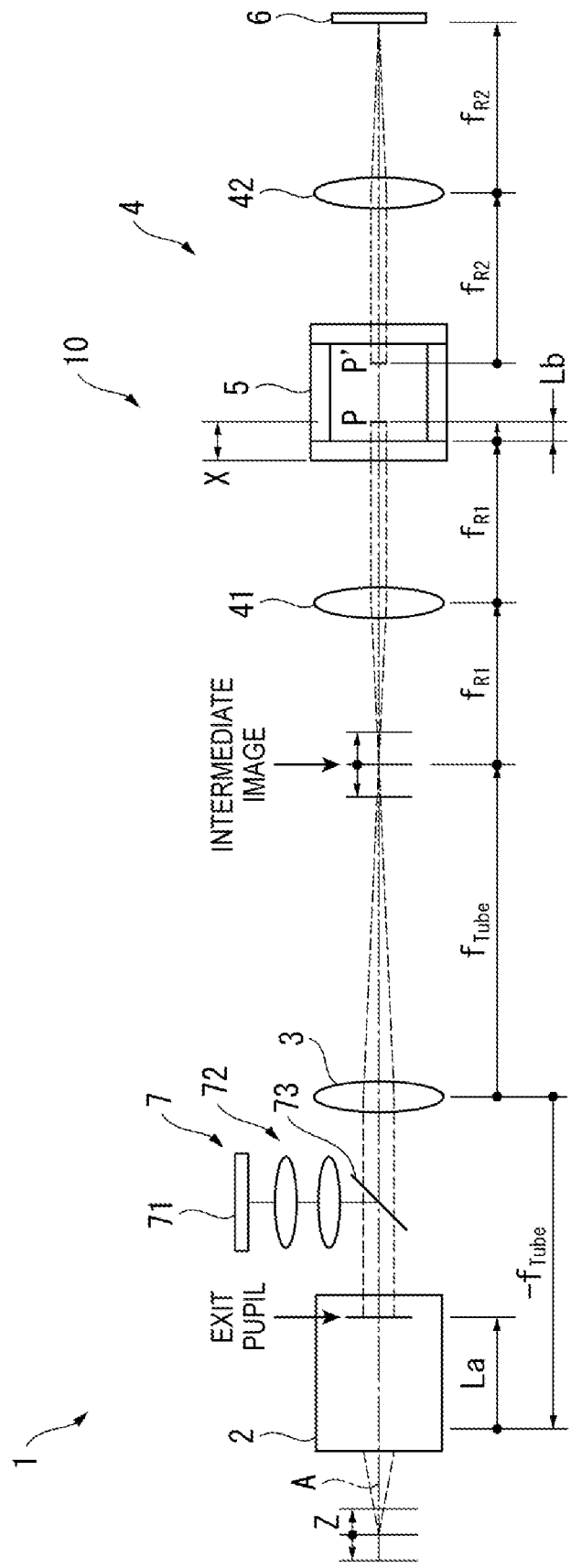
FIG. 1 is a schematic diagram showing a variable focal length lens device including a variable focal length optical system according to an exemplary embodiment of the invention.

FIG. 1 shows a microscope system 1 including a variable focal length optical system 10 according to an exemplary embodiment. The microscope system 1 is a device configured to capture an image of a workpiece with a periodic change in a focusing position Z relative to a surface of the workpiece placed in an image-capturing region.

As shown in FIG. 1, the microscope system 1 includes an objective lens 2, a variable focal length optical system 10 including a lens system 5, an image capturing unit 6 configured to capture an image through the objective lens 2 and the variable focal length optical system 10, and an illuminator 7.

It should be noted that the microscope system 1 may further include a lens controller configured to control the lens system 5, an image processing unit configured to process an image captured by the image capturing unit 6, and the like, which are not shown in FIG. 1.

The objective lens 2, which includes one or more lenses, is opposed to the surface of the workpiece. The objective lens 2, which is an infinity corrected lens, is configured to convert light reflected on the workpiece into a parallel beam of light to enter the variable focal length optical system 10. A magnification and a focal length of the objective lens 2 are not particularly limited.

The variable focal length optical system 10, which constitutes a unit combinable with the objective lens 2, is located on the same optical axis A as the objective lens 2 is. The variable focal length optical system 10 includes, in sequence from an object side (front side), an imaging lens 3, a first relay lens 41, the liquid resonant lens system 5, and a second relay lens 42.

The imaging lens 3, which includes one or more lenses, is configured to condense the parallel beam of light entering from the objective lens 2, forming an intermediate image.

The first relay lens 41 and the second relay lens 42 each include one or more lenses. The first relay lens 41 and the second relay lens 42, which constitute a relay system 4, are configured to relay the intermediate image formed by the imaging lens 3, causing the intermediate image to be re-imaged on an image capturing surface of the image capturing unit 6.

In this regard, a distance between the imaging lens 3 and the first relay lens 41 is equal to a total length of a focal length $f_{Tube}$ of the imaging lens 3 and a focal length $f_{R1}$ of the first relay lens 41. In other words, a rear focal point of the imaging lens 3 and a front focal point of the first relay lens 41 are located at the same position.

The lens system 5 is configured as a graded-index variable focal length lens. Specifically, the lens system 5 includes: a cylindrical case filled with a liquid; and a cylindrical vibration member formed of a piezoelectric material. The vibration member, which is connected to the lens controller (not shown) via a signal line while being immersed in the liquid in the case, is configured to vibrate in response to a drive signal (for instance, a sinusoidal alternating-current signal) inputted from the lens controller. When a frequency of the drive signal is adjusted to a resonant frequency, a standing wave is generated in the liquid within the lens system 5, whereby a refractive index of the liquid periodically changes.

Further, the lens system 5 includes a window for letting light through, so that a periodic change in the refractive index of the liquid within the lens system 5 leads to a periodic change in a focal length of the lens system 5. According to the lens system 5, the focusing position Z periodically changes with a change in the focal length of the lens system 5 with reference to the focal length of the objective lens 2.

Figure 2:
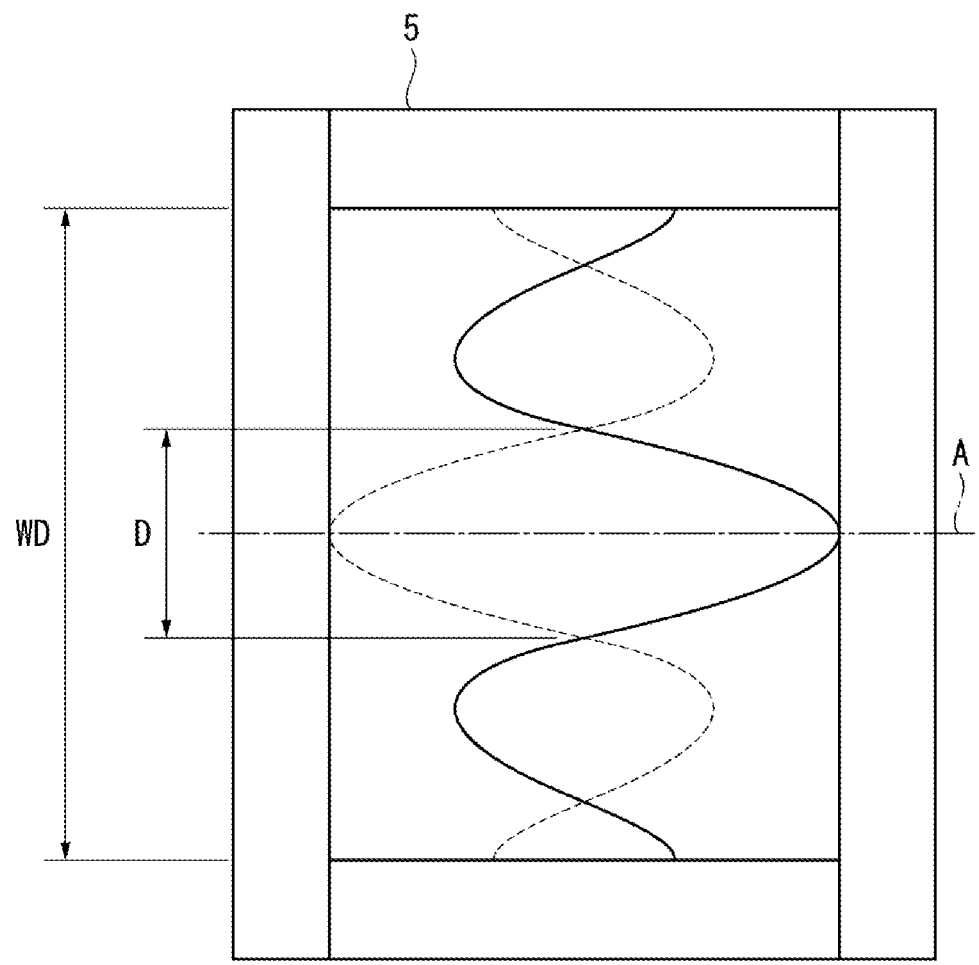
FIG. 2 is a schematic diagram showing a lens system according to the exemplary embodiment.

It should be noted that an opening diameter WD of the window of the lens system 5 is designed to be larger than an effective diameter D of the lens system 5 as shown in FIG. 2. In this regard, the effective diameter D of the lens system 5 corresponds to a diameter between nodes of the standing wave generated in the liquid within the lens system 5 around the optical axis A.

In the exemplary embodiment, the effective diameter D of the lens system 5 is set within a range comparable (for instance, ±10%) to an exit pupil diameter of the objective lens 2 with, for instance, 1-10× magnification.

The image capturing unit 6, which includes an existing CCD image sensor or any other type of camera or the like, is configured to capture an image formed on the image capturing surface. The image capturing unit 6 is configured to output the captured image in a predetermined signal form to an image processor or the like.

The illuminator 7 includes: a light source 71 such as an LED that emits light; an illumination optical system 72 configured to adjust the light emitted from the light source 71; and a beam splitter 73 configured to reflect the light adjusted by the illumination optical system 72 toward the objective lens 2. The light reflected by the beam splitter 73 is applied to the workpiece through the objective lens 2. It should be noted that the beam splitter 73 transmits the light that has been reflected on the workpiece and passed through the objective lens 2.

It should be noted that the illuminator 7 emits a continuous light or a pulse light. When the illuminator 7 emits a continuous light, a focal sweep image with the focusing position Z continuously changing is captured. Meanwhile, when the illuminator 7 performs pulse emission at a desired timing with respect to a cycle of the lens system 5, an image focused at the desired focusing position Z is captured.

Power Arrangement of Variable Focal Length Optical System

Description will be made on a power arrangement of the variable focal length optical system 10 with reference to FIG. 1.

In the following description, the focal length of the lens system 5 is denoted by $f_s$, the focal length of the objective lens 2 is denoted by $f_{obj}$, the focal length of the imaging lens 3 is denoted by $f_{Tube}$, the focal length of the first relay lens 41 is denoted by $f_{R1}$, and a focal length of the second relay lens 42 is denoted by $f_{R2}$. Further, a distance from a front focal point of the imaging lens 3 to the exit pupil of the objective lens 2 is denoted by La and a distance from a rear focal point of the first relay lens 41 to a front principal point P of the lens system 5 is denoted by Lb. In addition, a distance from a front end surface of the lens system 5 to the front principal point P of the lens system 5 is denoted by X.

Conjugation Arrangement

In the variable focal length optical system 10, the front principal point P of the lens system 5 is located such that the front principal point P is conjugated with the exit pupil of the objective lens 2 to prevent a total magnification of the microscope system 1 from changing while the focal length $f_s$ of the lens system 5 is changing.

Specifically, a total magnification β of the microscope system 1 is represented by the following expression (4), so that the lens system 5 is located in a manner to satisfy the following expression (5).

$$\beta = \frac{f_{Tube} f_{R2}}{f_{obj} f_{R1}} \left[ 1 - \frac{1}{f_s} \left( Lb - \frac{f_{R1}^2}{f_{Tube}^2} La \right) \right] \quad (4)$$

$$Lb = \frac{f_{R1}^2}{f_{Tube}^2} La \quad (5)$$

With the expression (5) satisfied, the following expression (6) regarding the total magnification β of the microscope system 1 is satisfied.

$$\beta = \frac{f_{Tube} f_{R2}}{f_{obj} f_{R1}} \quad (6)$$

Since the focal length $f_s$ of the lens system 5 is not included in the expression (6), the total magnification β of the microscope system 1 is kept at a constant value even while the focal length $f_s$ is changing. Further, a field of vision of the microscope system 1 is kept constant.

Focal Length Ratio Between Imaging Lens and First Relay Lens

The focusing position Z is represented by the following expression (7). Accordingly, when the front principal point P of the lens system 5 is located such that the front principal point P is conjugated with the exit pupil of the objective lens 2 (i.e., when the above expression (6) is satisfied), the following expression (8) is established with respect to the focusing position Z.

$$Z = \frac{f_{obj}^2 f_{R1}^2}{f_{Tube}^2 f_s} \left[ 1 - \frac{1}{f_s} \left( Lb - \frac{f_{R1}^2}{f_{Tube}^2} La \right) \right]^{-1} \quad (7)$$

$$Z = \frac{f_{obj}^2 f_{R1}^2}{f_{Tube}^2 f_s} \quad (8)$$

According to the expression (8), a range of variation (scan range) of the focusing position Z is proportional to $f_{R1}^2/f_{Tube}^2$. Thus, the scan range increases with a decrease in a ratio $f_{Tube}/f_{R1}$ of the focal length $f_{Tube}$ of the imaging lens 3 to the focal length $f_{R1}$ of the first relay lens 41. Accordingly, in the exemplary embodiment, the ratio $f_{Tube}/f_{R1}$ is set at 2.15 or less to ensure a practical scan range.

Further, in order to improve a Strehl ratio of the microscope system 1, it is desirable to reduce a ratio of an entrance pupil diameter of the lens system 5 to the effective diameter D of the lens system 5. The entrance pupil diameter of the lens system 5 decreases with an increase in the ratio $f_{Tube}/f_{R1}$ of the focal length $f_{Tube}$ of the imaging lens 3 to the focal length $f_{R1}$ of the first relay lens 41.

Accordingly, in the exemplary embodiment, the above ratio f-rube/$f_{R1}$ is set at 1.90 or more, which enables to sufficiently reduce the ratio of the entrance pupil diameter of the lens system 5 to the effective diameter D of the lens system 5. By this operation, the Strehl ratio of the microscope system 1 becomes 0.8 or more, so that a substantially aplanatic state is achievable.

Therefore, the variable focal length optical system 10 according to the exemplary embodiment is set such that the following expression (1) is satisfied.

$$1.90 \leq f_{Tube}/f_{R1} \leq 2.15 \quad (1)$$

In other words, with the above expression (1) satisfied by the variable focal length optical system 10, the microscope system 1 according to the exemplary embodiment, which includes the relay system configured to keep the total magnification β and the field of vision constant, can ensure performance such as the scan range and the Strehl ratio.

Focal Length of First Relay Lens

It is preferable that the focal length $f_{R1}$ of the first relay lens 41 is set larger than the distance X from the front end surface of the lens system 5 to the front principal point P of the lens system 5.

Further, although an upper limit of the focal length $f_{R1}$ of the first relay lens 41 is not particularly limited, setting the focal length $f_{R1}$ of the first relay lens 41 considerably larger than the above distance X causes an increase in a size of the variable focal length optical system 10 and thus is not preferable.

Accordingly, it is preferable that the focal length $f_{R1}$ of the first relay lens 41 is set such that the following expression (2) is satisfied.

$$X < f_{R1} \leq 2X \quad (2)$$

With such a setting, the variable focal length optical system 10 can be downsized with the first relay lens 41 and the lens system 5 prevented from interfering with each other.

Focal Length of Second Relay Lens

A focal length $f_{R2}$ of the second relay lens 42 can be set as desired in accordance with the setting of the total magnification β of the microscope system 1.

However, it is preferable that, when the above expression (1) and expression (2) are satisfied, the focal length $f_{R2}$ of the second relay lens 42 is set such that the following expression (3) is satisfied. It should be noted that $f_{obj1x}$ denotes a focal length of the objective lens 2 with 1× magnification.

$$f_{R2} = f_{obj1x} \times f_{R1}/f_{Tube} \quad (3)$$

With such a configuration, the variable focal length optical system 10 constitutes a same-magnification relay system. The total magnification β of the microscope system 1 thus reaches a magnification usually expected on the basis of the magnification of the objective lens 2.

Example

With use of Example with the following settings, the scan range and the Strehl ratio were simulated by changing a ratio between the focal length $f_{Tube}$ of the imaging lens 3 and the focal length $f_{R1}$ of the first relay lens 41.

It should be noted that, in the simulation, the focal length $f_{R1}$ of the first relay lens 41 was changed with the focal length $f_{Tube}$ of the imaging lens 3 fixed, and the focal length $f_{R2}$ of the second relay lens 42 was adjusted such that the variable focal length optical system 10 constituted a same-magnification relay. Further, optical design simulation software was used to calculate the scan range and the Strehl ratio. Further, the focal length $f_{objx1}$ of the 1×-magnification-objective lens 2 was 200 mm.

Figure 3:
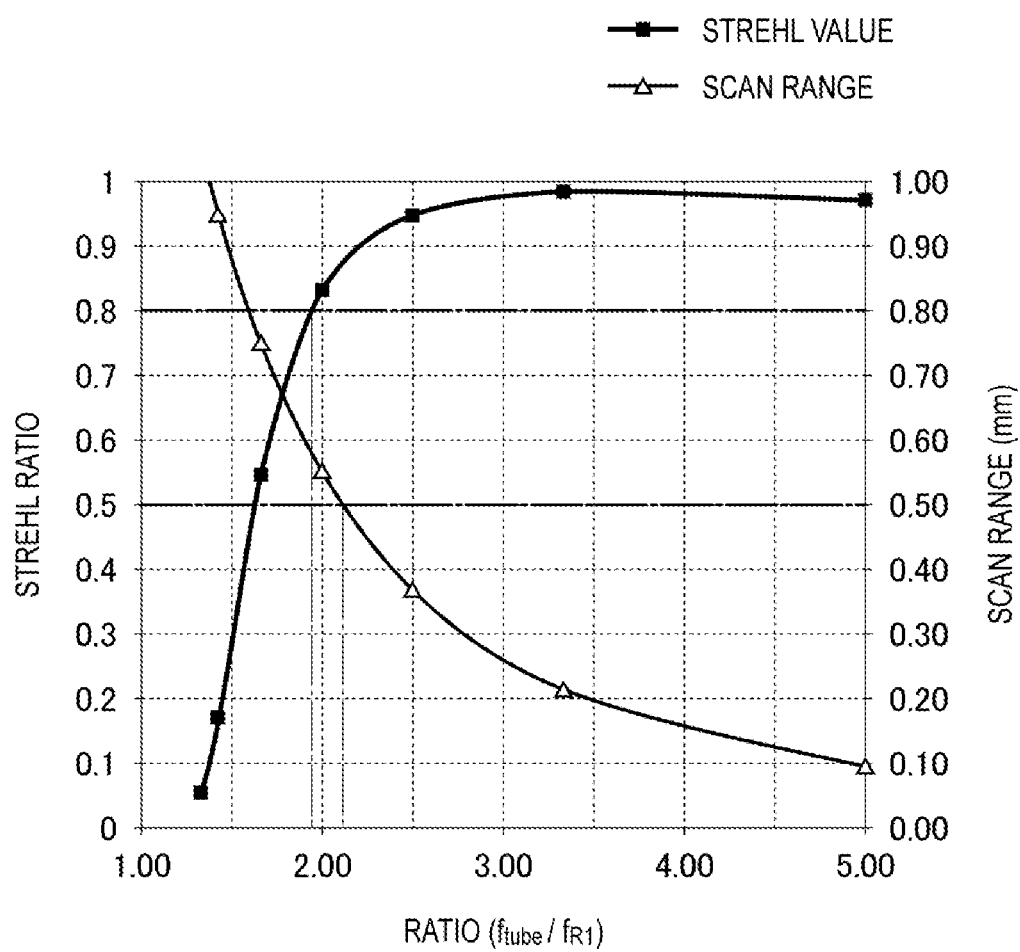
FIG. 3 is a graph showing a Strehl ratio and a scan range relative to a ratio in focal length between an imaging lens and a first relay lens.

Objective Lens 2
  magnification: 5×
  focal length $f_{obj}$: 40 mm
  exit pupil diameter: 11.2 mm
Lens System 5
  window diameter: 16 mm
  effective diameter D: 11 mm
  front principal point position (the distance X from the front end surface to the front principal point): 25.7 mm
  length in optical axis direction: 74.3 mm
Imaging Lens 3
  focal length $f_{Tube}$: 100 mm
First Relay Lens 41
  focal length $f_{R1}$: 20 to 75 mm
Second Relay Lens 42
  focal length $f_{R2}$: $f_{objx1} f_{R1}/f_{Tube} = 2f_{R1}$ FIG. 3 is a graph showing simulation results. In FIG. 3, an abscissa axis represents the ratio $f_{Tube}/f_{R1}$ of the focal length $f_{Tube}$ of the imaging lens 3 to the focal length $f_{R1}$ of the first relay lens 41 and an ordinate axis represents the scan range (mm) or the Strehl ratio.

As shown in FIG. 3, the scan range quadratically decreases with an increase of the ratio $f_{Tube}/f_{R1}$ from 1.00 toward 5.00. A practical scan range for 5× magnification, i.e., 0.50 mm, can be achieved at the ratio $f_{R1}/f_{Tube}$ in a range of 2.15 or less.

Further, the Strehl ratio increases with an increase of the ratio $f_{Tube}/f_{R1}$ from 1.00 toward 3.00 and the Strehl ratio approximates to 1.0 at the ratio $f_{Tube}/f_{R1}$ in a range of 3.00 or more.

A Strehl ratio at which a substantially aplanatic state is achieved usually 0.8 or more and, in Example, the Strehl ratio reaches 0.8 or more at the ratio $f_{Tube}/f_{R1}$ in a range of 1.90 or more.

The above simulation results demonstrate that, when the ratio between the focal length $f_{Tube}$ of the imaging lens 3 and the focal length $f_{R1}$ of the first relay lens 41 satisfies the following expression (1), the scan range and the Strehl ratio both become favorable.

$$1.90 \leq f_{Tube}/f_{R1} \leq 2.15 \qquad \text{Expression (1)}$$

In this regard, as the ratio $f_{Tube}/f_{R1}$ is decreased below 1.90, the scan range increases, whereas the Strehl ratio decreases. This is because the entrance pupil diameter of the lens system 5 increases with a decrease in the ratio $f_{Tube}/f_{R1}$, resulting in an increase in a ratio of the entrance pupil diameter of the lens system 5 to the effective diameter of the lens system 5.

Further, an excessive increase in the scan range is disadvantageous in that the design of the lenses becomes difficult.

Entire Length of Variable Focal Length Optical System

As shown in FIG. 1, an entire length of the variable focal length optical system 10 is $f_{Tube}+(f_{R1}+f_{R2})\times2+\alpha$. In this regard, a denotes a distance between the front principal point P and a rear principal point P' of the lens system.

As an example satisfying the expressions (1) to (3) in Example above, the focal length $f_{Tube}$ of the imaging lens 3, the focal length $f_{R1}$ of the first relay lens 41, and the focal length $f_{R2}$ of the second relay lens 42 can be set within the following respective ranges. It should be noted that $f_{Tube}/f_{R1}=2.00$.

51.4 mm<$f_{Tube}$≤111.4 mm 25.7 mm<$f_{R1}$≤55.7 mm $f_{R2}$=100 mm

Such settings cause the entire length of the variable focal length optical system 10 to fall within a range from 302.8 mm+α to 422.8 mm+α.

Meanwhile, as Comparative Example, in simply setting the optical design of the variable focal length optical system 10, the focal length $f_{Tube}$ of the imaging lens 3 may be set at a value equal to the focal length $f_{obj}$ of the objective lens 2 with 1× magnification to set the respective focal lengths of the two relay lenses at values equal to each other.

In this regard, since a focal length of an objective lens with 1× magnification for a typical microscope is approximately 200 mm, the focal length $f_{Tube}$ of the imaging lens 3 in Comparative Example is set at, for instance, 200 mm. In this case, to make the entire length of the variable focal length optical system 10 comparable to that of Example above (a range from 302.8 mm+a to 422.8 mm+a), the respective focal lengths $f_{R1}$ and $f_{R2}$ of the first relay lens 41 and the second relay lens 42 are each set within a range from 25.7 mm to 55.7 mm. In this case, the ratio $f_{Tube}/f_{R1}$ of the focal length $f_{Tube}$ of the imaging lens 3 to the focal length $f_{R1}$ of the first relay lens 41 reaches 3.6 to 7.8, causing a considerable decrease in the scan range (see FIG. 3). Meanwhile, when the focal length $f_{R1}$ of the first relay lens 41 is set large to ensure the scan range, the entire length of the variable focal length optical system 10 becomes considerably larger than in Example.

Therefore, Example satisfying the expressions (1) and (2) enables a reduction in the entire length of the variable focal length optical system 10 with the performance of the variable focal length optical system 10 maintained, as compared with Comparative Example. Further, Example satisfying the expression (3) enables the total magnification of the microscope system 1 to be a magnification usually expected on the basis of the magnification of the objective lens 2 as Comparative Example.

Modifications

The invention is not limited to the above exemplary embodiment and modifications and the like that are compatible with an object of the invention are within the scope of the invention.

In the above exemplary embodiment, the variable focal length optical system 10 constitutes a same-magnification relay; however, the invention is not limited thereto and a magnification different from a magnification usually expected on the basis of the magnification of the objective lens 2 may be achieved by changing the focal length $f_{R2}$ of the second relay lens 42.

In the above exemplary embodiment, the focal length $f_{R1}$ of the first relay lens is set within a range to satisfy the above expression (2); however, the invention is not limited thereto and the focal length $f_{R1}$ only has to be set within a range to satisfy the above expression (1).

In the above exemplary embodiment, the description is made on the microscope system 1 including the variable focal length optical system 10; however, the variable focal length optical system 10 may be used in an image measurement device or the like instead of the microscope system 1.

What is claimed is:

1. A variable focal length optical system used in combination with an infinity corrected objective lens, the variable focal length optical system comprising:
    an imaging lens configured to condense a parallel beam of light from the objective lens to form an intermediate image;
    a relay system comprising, in sequence from an object side, a first relay lens and a second relay lens, the relay system configured to relay the intermediate image to infinity; and
    a lens system of a liquid resonant type which is located between the first relay lens and the second relay lens, the lens system having a refractive index that changes in response to an inputted drive signal, wherein
    a front principal point of the lens system is located to be conjugated with an exit pupil of the objective lens, and
    with $f_{Tube}$ denoting a focal length of the imaging lens and $f_{R1}$ denoting a focal length of the first relay lens, an expression (1) below is satisfied, $$1.90 < f_{Tube}/f_{R1} \leq 2.15 \quad (1).$$

2. The variable focal length optical system according to claim 1, wherein
    with X denoting a distance from a front end surface of the lens system to the front principal point of the lens system, an expression (2) below is satisfied, $$X < f_{R1} \leq 2X \quad (2).$$

3. The variable focal length optical system according to claim 1, wherein
    with $f_{R2}$ denoting a focal length of the second relay lens and $f_{obj1x}$ denoting a focal length of the objective lens with 1× magnification, an expression (3) below is satisfied, $$f_{R2} = f_{obj1x} \times f_{R1}/f_{Tube} \quad (3).$$

* * * * *